(12) United States Patent
Apilado

(10) Patent No.: US 11,254,259 B1
(45) Date of Patent: Feb. 22, 2022

(54) BRACKET FOR MOUNTING LIGHT TO STEERING ARM

(71) Applicant: Alexander Nathanel Apilado, Tracy, CA (US)

(72) Inventor: Alexander Nathanel Apilado, Tracy, CA (US)

(*) Notice: Subject to any disclaimer, the term of this patent is extended or adjusted under 35 U.S.C. 154(b) by 0 days.

(21) Appl. No.: 17/188,926

(22) Filed: Mar. 1, 2021

Related U.S. Application Data

(63) Continuation of application No. 63/063,535, filed on Aug. 10, 2020.

(51) Int. Cl.
| | |
|---|---|
| *B60Q 1/26* | (2006.01) |
| *F21V 21/00* | (2006.01) |
| *B60Q 1/18* | (2006.01) |
| *B60Q 1/124* | (2006.01) |
| *B60Q 1/068* | (2006.01) |
| *B60Q 1/06* | (2006.01) |
| *B60Q 1/12* | (2006.01) |

(52) U.S. Cl.
CPC ............ *B60Q 1/2661* (2013.01); *F21V 21/00* (2013.01); *B60Q 1/06* (2013.01); *B60Q 1/068* (2013.01); *B60Q 1/12* (2013.01); *B60Q 1/124* (2013.01); *B60Q 1/18* (2013.01)

(58) Field of Classification Search
CPC ........ B60Q 1/2661; B60Q 1/06; B60Q 1/124; B60Q 1/068; B60Q 1/18; B60Q 1/12; F21V 21/00
USPC .............................................. 362/549, 37, 53
See application file for complete search history.

(56) References Cited

U.S. PATENT DOCUMENTS

| | | | | |
|---|---|---|---|---|
| 1,412,911 A | * | 4/1922 | Anthony ................. | B60Q 1/124 362/37 |
| 1,611,392 A | * | 12/1926 | Thompson ............. | B60Q 1/124 362/43 |
| 4,442,477 A | * | 4/1984 | Hennessey ............... | B60Q 1/12 180/900 |

* cited by examiner

*Primary Examiner* — Laura K Tso
(74) *Attorney, Agent, or Firm* — Plager Schack LLP; Mark H. Plager; Kara Verryt

(57) ABSTRACT

A light mount for mounting a light to a steering arm on an axle may include a bracket designed to attach to the steering arm; and a bracket orifice extending through a portion of the bracket, the bracket orifice sized to accommodate a light pod fastener extending from a light pod, wherein the bracket and, thus, the light pod rotate with rotation of the steering arm. The bracket may have various forms and may be a Z-shaped bracket, a mounting perch integrated into the structure of a steering arm, or a mounting plate designed to be attached to an existing steering arm.

5 Claims, 4 Drawing Sheets

BRACKET FOR MOUNTING LIGHT TO STEERING ARM

RELATED APPLICATION

This application claims priority to provisional patent application U.S. Ser. No. 63/063,535 filed on Aug. 10, 2020, the entire contents of which is herein incorporated by reference.

BACKGROUND

The embodiments described herein relate generally to automotive accessories and, more particularly, to a bracket for mounting a light to a steering arm on an axle.

Most vehicles do not have lights that turn with the wheels, leading to night time visibility issues. While some high end vehicles come standard with this feature, there is currently no aftermarket product that can be added to a vehicle with standard lights to allow the lights to turn with the wheels.

Therefore, what is needed is a bracket for mounting a light to a steering arm on an axle, allowing the light to turn with the turning of the steering wheel.

SUMMARY

Some embodiments of the present disclosure include a light mount for mounting a light to a steering arm on an axle. The light mount may include a bracket designed to attach to the steering arm; and a bracket orifice extending through a portion of the bracket, the bracket orifice sized to accommodate a light pod fastener extending from a light pod, wherein the bracket and, thus, the light pod rotate with rotation of the steering arm. The bracket may have various forms and may be a Z-shaped bracket, a mounting perch integrated into the structure of a steering arm, or a mounting plate designed to be attached to an existing steering arm.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a light mounting bracket and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-9, some embodiments of the invention include a light mount for mounting a light pod 22 to a steer arm, such as kingpin steering knuckle 40 or steering knuckle 10, on an axle tube 16 in a vehicle, the light mount comprising a bracket attached, such as removably or permanently attached, to the steer arm and to the light pod 22 such that the light pod 22 moves with the steer arm.

Figure 1:
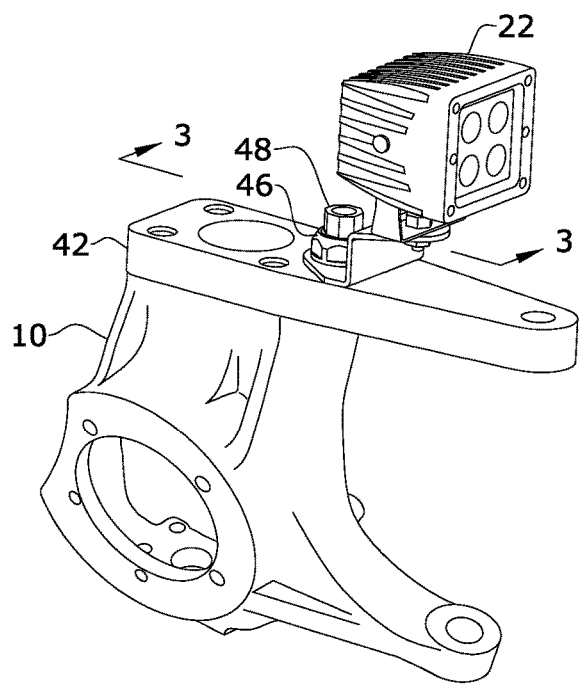
FIG. 1 is a perspective view of one embodiment of the present disclosure, shown in use.
Figure 2:
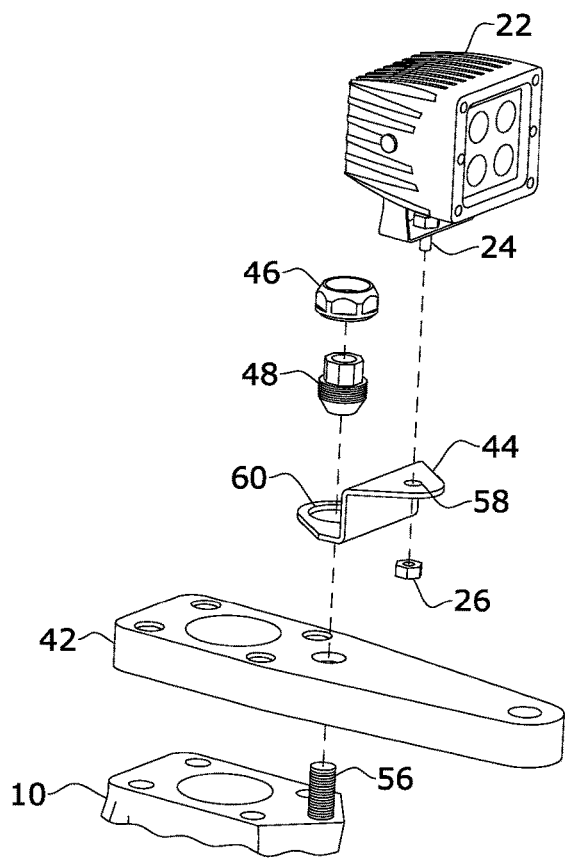
FIG. 2 is an exploded view of one embodiment of the present disclosure.
Figure 3:
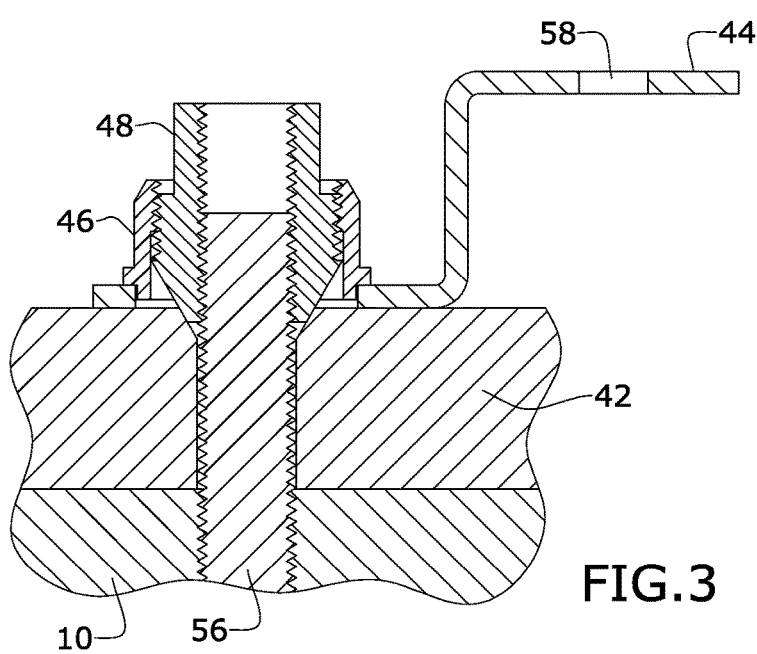
FIG. 3 is a section view of one embodiment of the present disclosure, taken along line 3-3 in FIG. 1.
Figure 4:
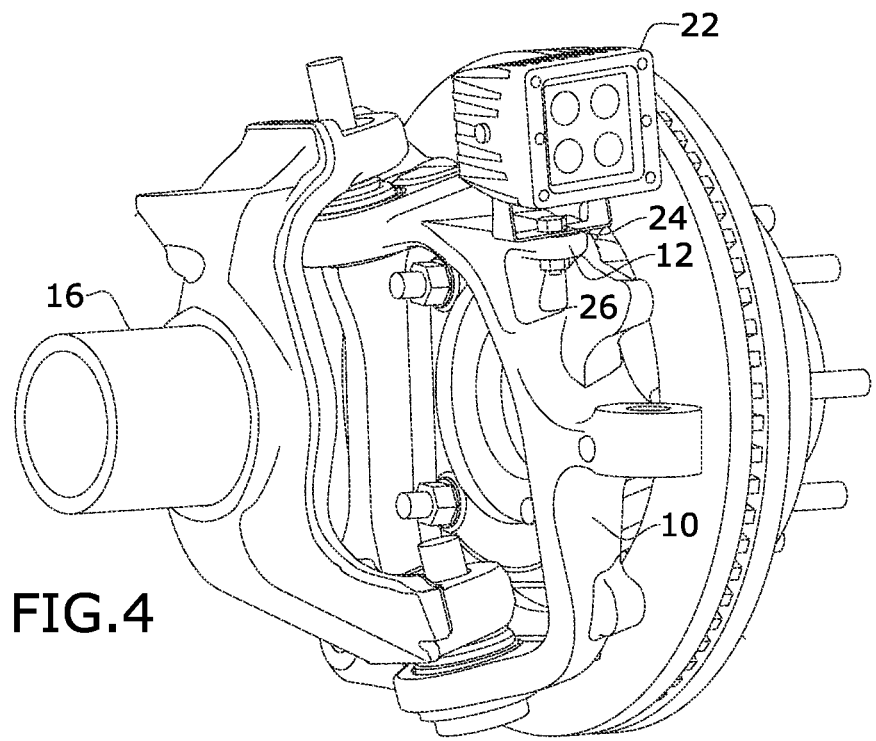
FIG. 4 is a perspective view of one embodiment of the present disclosure, shown in use.
Figure 5:
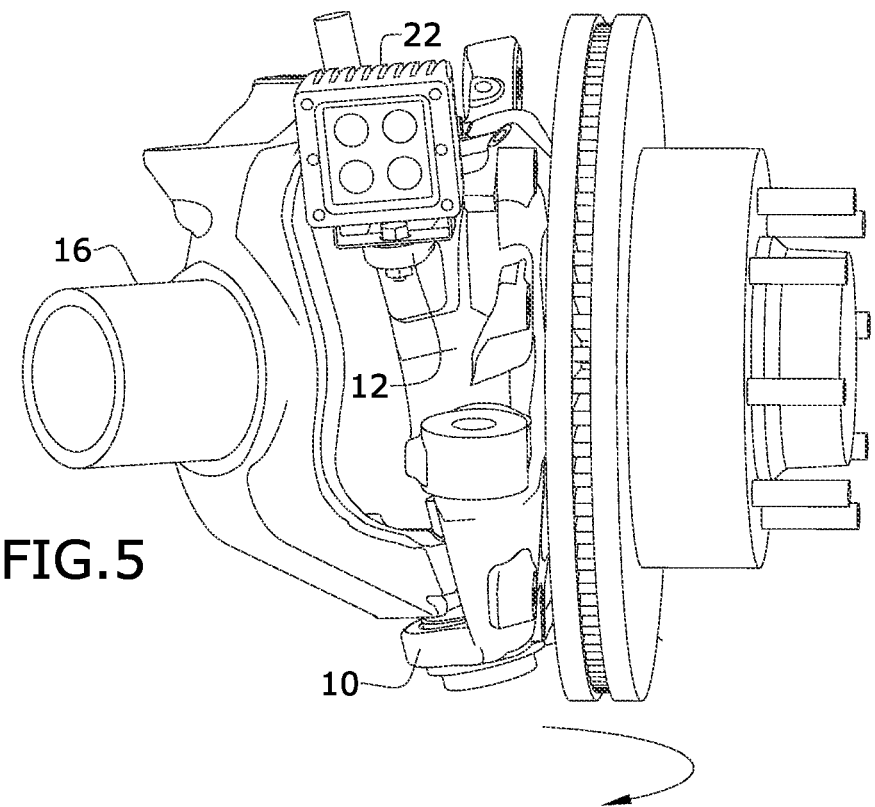
FIG. 5 is a perspective view of one embodiment of the present disclosure, shown in use.
Figure 6:
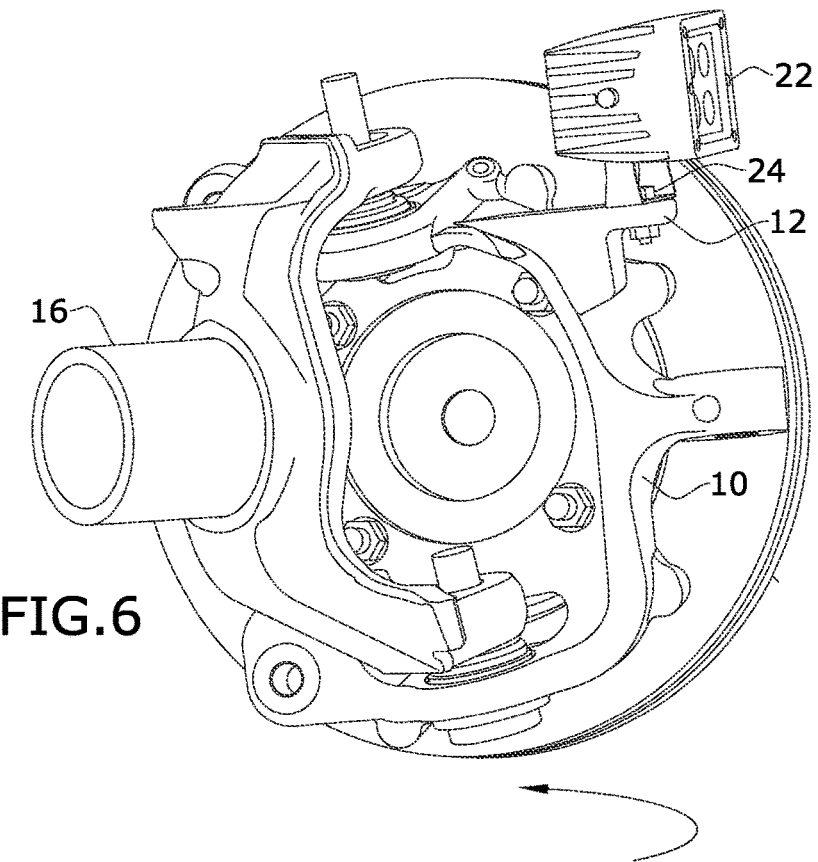
FIG. 6 is a perspective view of one embodiment of the present disclosure, shown in use.
Figure 7:
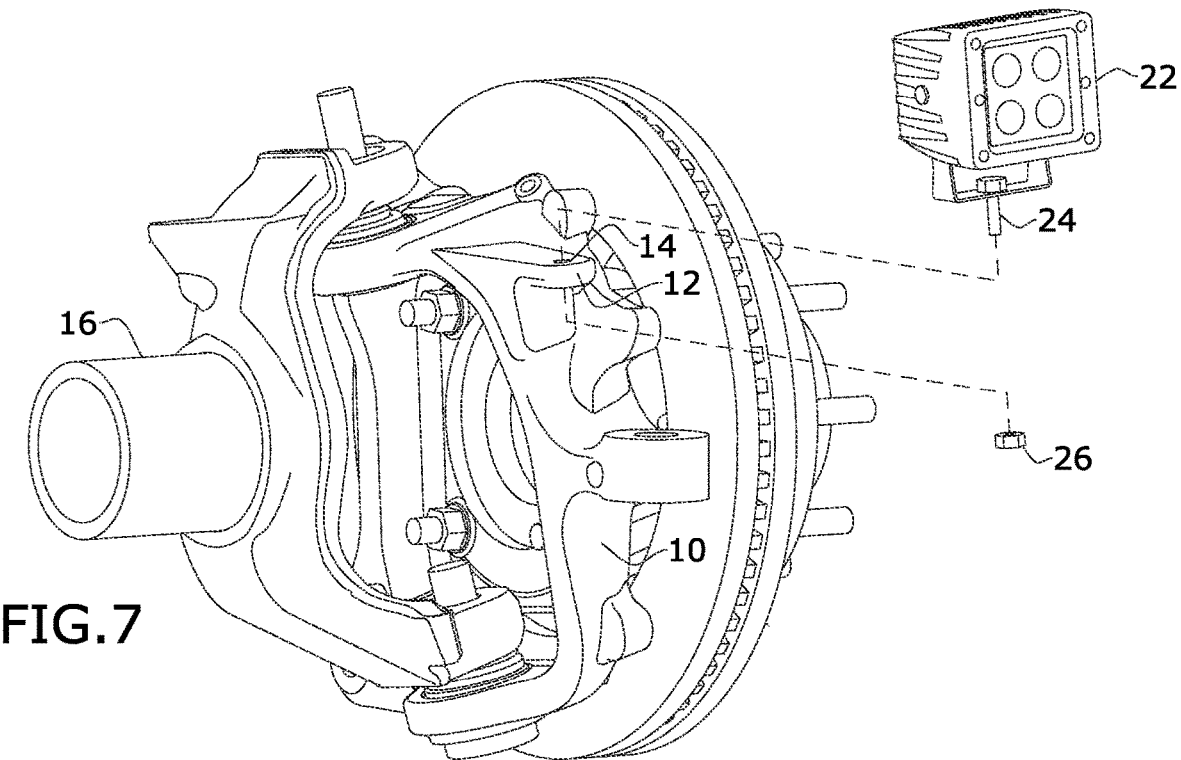
FIG. 7 is an exploded view of one embodiment of the present disclosure.

As shown in FIGS. 1-3, the bracket may comprise a Z-shaped bracket, wherein a first portion of the bracket is designed to be positioned flush to a kingpin mounting plate 42 on a kingpin steering knuckle 40, the first portion including a mounting plate stud orifice 60 extending there through, the mounting plate stud orifice 60 sized to accommodate a kingpin stud 56 and a fastener positioned therein. For example, as shown in FIG. 3, the king pin stud 56 may extend upwards from the kingpin mounting knuckle and the kingpin 40 mounting plate 42 through the mounting plate stud orifice 60. An inner nut 48 with threaded interior walls may be engaged with the threads on the kingpin stud 56, and an outer nut 46 may engage with threads on the outer wall of the inner nut 48, thus securing the bracket to the kingpin mounting plate 42. As shown in the Figures, the inner nut 48 may comprise, for example, a tapered nut, such as a Chevy wheel nut, wherein the end of the inner nut 48 extending through the mounting plate stud orifice may have a taper off, for example, about 60 degrees, which may allow the inner nut 48 to seat fully into the steering knuckle or high steer components.

A second portion of the bracket may comprise a mounting plate 44, wherein the mounting plate 44 may be substantially parallel to and spaced from the first portion of the bracket, wherein the mounting plate 44 may comprise a mounting orifice 58 extending there through. The mounting orifice 58 may be sized to accommodate a fastener, such as a bolt 24, extending from the light pod 22, wherein the bolt 24 may be designed to engage with a mounting nut 26 on an opposite side of the mounting plate 44 from the light pod 22.

As shown in FIGS. 4-7, the bracket may comprise a mounting perch 12 integrated onto the steering knuckle 10. In other words, the bracket may be forged/cast/fabricated as part of the knuckle 10. As shown in the Figures, the mounting perch 12 may extend substantially outward from the outer surface of the knuckle 10. The mounting perch 12 may include a mounting orifice 14 extending there through, wherein the mounting orifice 14 is sized to accommodate the fastener, such as bolt 24, extending from the light pod 22, wherein a nut 26 may be used to engage with the bolt 24 to secure the light pod 22 to the mounting perch 12. Thus, in some embodiments, the device may comprise a newly designed steering knuckle with an incorporated or integrated mounting perch 12.

Figure 8:
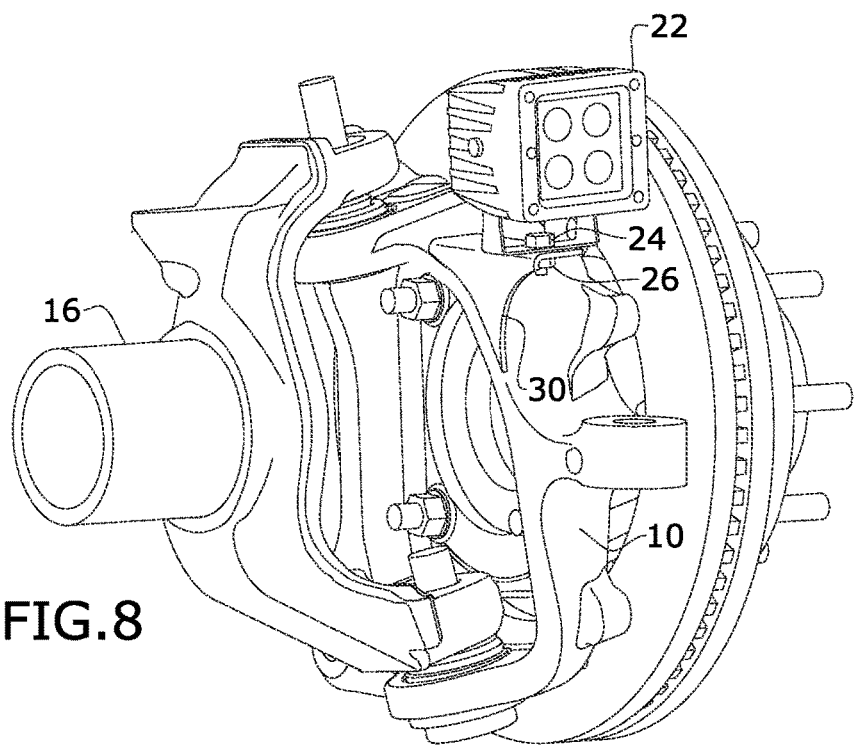
FIG. 8 is a perspective view of one embodiment of the present disclosure, shown in use.
Figure 9:
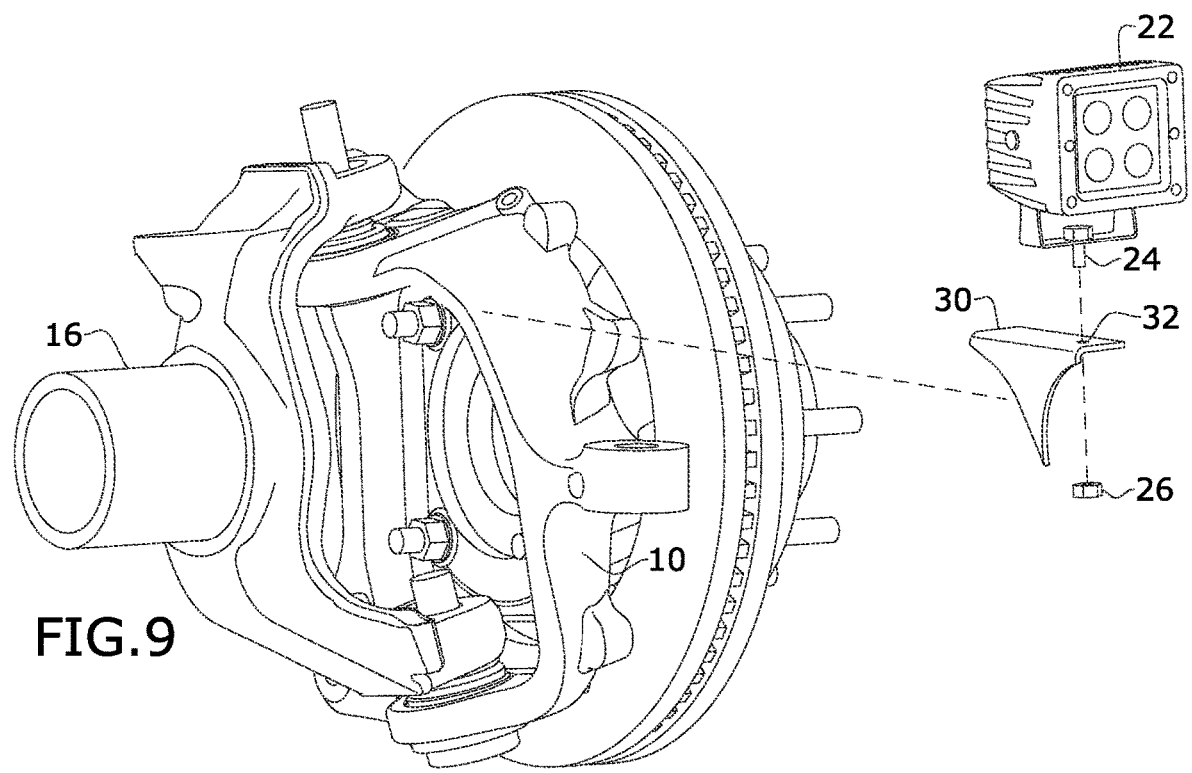
FIG. 9 is an exploded view of one embodiment of the present disclosure.

In yet a further embodiment, and as shown in FIGS. 8 and 9, the bracket may comprise a mounting plate designed to be attached, such as permanently attached, to an existing steering knuckle 10. For example, the bracket may comprise a weld-on plate 30 designed to be welded or otherwise securely attached to an outer surface of the steering knuckle 10. Thus, a first, inner edge of the weld-on plate 30 may mimic the shape of the outer surface of the steering knuckle 10, while the outer edge may extend outward from the steering knuckle, thus forming a mounting surface. The mounting surface of the weld-on plate 30 may include a mounting orifice 32 extending there through, wherein the mounting orifice 32 is sixed to accommodate the fastener, such as bolt 24, extending from the light pod 22, wherein a nut 26 may be used to engage with the bolt 24 to secure the light pod 22 to the weld-on plate 30. Thus, in some embodiments, the bracket may include an aftermarket part that may be added to an existing steering knuckle.

While the above describes various potential brackets, it is understood that other shaped brackets are envisioned, depending on the specifics of the steering arm. Moreover, the mount may be varied slightly depending on the axle used in the vehicle. In embodiments, the mount may be used with, for example, Dana 35 axles, Dana 44½ and ¾ ton axles, Dana 50 axles, Dana 60 ball joint and kingpin axles, Dana 70 axles, Dana 80 axles, Ford 9 inch axles, Chevy 14 bolt axles, Toyota truck axles, Suzuki Samurai axles, and independent front suspension vehicles.

To use the mount of the present disclosure, the bracket may be mounted to the steer arm/steering knuckle using a fastener, such as a bolt, and a nut. Alternatively, the bracket may be welded onto or incorporated into the body of the steering arm. A light pod 22 may then be mounted to the bracket by inserting a fastener, such as a bolt, extending from the light pod 22 through the bracket orifice and securing with a nut.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A light mount for mounting a light to a steering arm on an axle, the light mount comprising:
   a bracket designed to attach to the steering arm; and
   a bracket orifice extending through a portion of the bracket, the bracket orifice sized to accommodate a light pod fastener extending from a light pod,
   wherein:
      the bracket and, thus, the light pod rotate with rotation of the steering arm;
      the steering arm comprises a kingpin steering knuckle with an attached kingpin mounting plate; and
      the bracket comprises a Z-shaped bracket comprising:
         a first portion designed to be positioned flush against the kingpin mounting plate, the first portion including a mounting plate stud orifice extending there through, the mounting plate stud orifice sized to accommodate a kingpin stud and a fastener positioned therein, wherein the fastener comprises an inner nut with threaded interior walls designed to engage with threads on the kingpin stud and an outer nut engaged with threads on an outer wall of the inner nut; and
         a second portion comprising a mounting plate, wherein the mounting plate is parallel to and spaced from the first portion of the bracket, wherein the bracket orifice extends through the mounting plate.

2. The light mount of claim 1, wherein the inner nut is a tapered nut.

3. The light mount of claim 2, wherein an end of the inner nut extending through the mounting plate stud orifice has a taper of about 60 degrees.

4. A light mount for mounting a light to a steering arm on an axle, the light mount comprising:
   a bracket designed to attach to the steering arm; and
   a bracket orifice extending through a portion of the bracket, the bracket orifice sized to accommodate a light pod fastener extending from a light pod,
   wherein:
      the bracket and, thus, the light pod rotate with rotation of the steering arm; and
      the bracket comprises a mounting perch integrated onto a structure of the steering arm.

5. The light mount of claim 4, wherein the mounting perch extends outward from the outer surface of the steering knuckle and includes the bracket orifice extending there through.

* * * * *